(12) United States Patent  
Blanchard et al.

(10) Patent No.: US 8,662,967 B1
(45) Date of Patent: Mar. 4, 2014

(54) MEAT PROCESSING APPARATUS AND METHOD

(75) Inventors: Michael John Blanchard, Farmington, AR (US); Carmon Timothy Ray, West Fork, AR (US)

(73) Assignee: Tyson Foods, Inc., Springdale, AR (US)

( * ) Notice: Subject to any disclaimer, the term of this patent is extended or adjusted under 35 U.S.C. 154(b) by 295 days.

(21) Appl. No.: 13/217,039

(22) Filed: Aug. 24, 2011

(51) Int. Cl.
*A22C 25/16* (2006.01)

(52) U.S. Cl.
USPC .......................................... 452/138

(58) Field of Classification Search
USPC ................................. 452/141–144
See application file for complete search history.

(56) References Cited

U.S. PATENT DOCUMENTS

| | | |
|---|---|---|
| 4,097,962 A | 7/1978 | Alley et al. |
| 4,303,206 A | 12/1981 | Prince et al. |
| 4,479,614 A | 10/1984 | Bernard |
| RE32,060 E | 12/1985 | McFarland |
| 4,566,640 A | 1/1986 | McFarland et al. |
| 4,700,899 A | 10/1987 | Powers et al. |
| 4,747,342 A | 5/1988 | Schack et al. |
| 4,780,931 A | 11/1988 | Powers et al. |
| 4,824,027 A * | 4/1989 | Shaw et al. ................. 241/24.16 |
| 4,970,757 A | 11/1990 | Heiland et al. |
| 5,160,290 A * | 11/1992 | Richburg ...................... 452/135 |
| 5,213,541 A * | 5/1993 | Richburg et al. ............. 452/135 |
| 5,306,202 A * | 4/1994 | Meeker ......................... 452/138 |
| 5,479,847 A | 1/1996 | Powers et al. |
| RE35,326 E * | 9/1996 | Richburg ...................... 452/135 |
| 5,553,985 A | 9/1996 | Schack et al. |
| 5,749,776 A * | 5/1998 | Evans ............................ 452/138 |
| 6,149,083 A * | 11/2000 | McFarland .................... 241/82.5 |
| 6,622,950 B1 * | 9/2003 | Fleming et al. ................. 241/74 |
| 6,737,095 B2 * | 5/2004 | Crider et al. .................. 426/480 |
| 7,074,442 B2 | 7/2006 | Crider, III et al. |
| 7,781,102 B2 * | 8/2010 | Graetz et al. .................. 429/226 |
| 7,922,567 B2 | 4/2011 | Gulak |

* cited by examiner

*Primary Examiner* — Richard Price, Jr.
(74) *Attorney, Agent, or Firm* — McAfee & Taft

(57) ABSTRACT

Meat processing, especially but not exclusively for bone-in-meat product (for example, chicken), uses a combination of equipment or process parameters to obtain high quality ground or boneless meat. Particular equipment implementations include a piston pump in combination with an extrusion screen, and particular process parameters include speed, temperature, pressure and screen configuration.

14 Claims, 3 Drawing Sheets

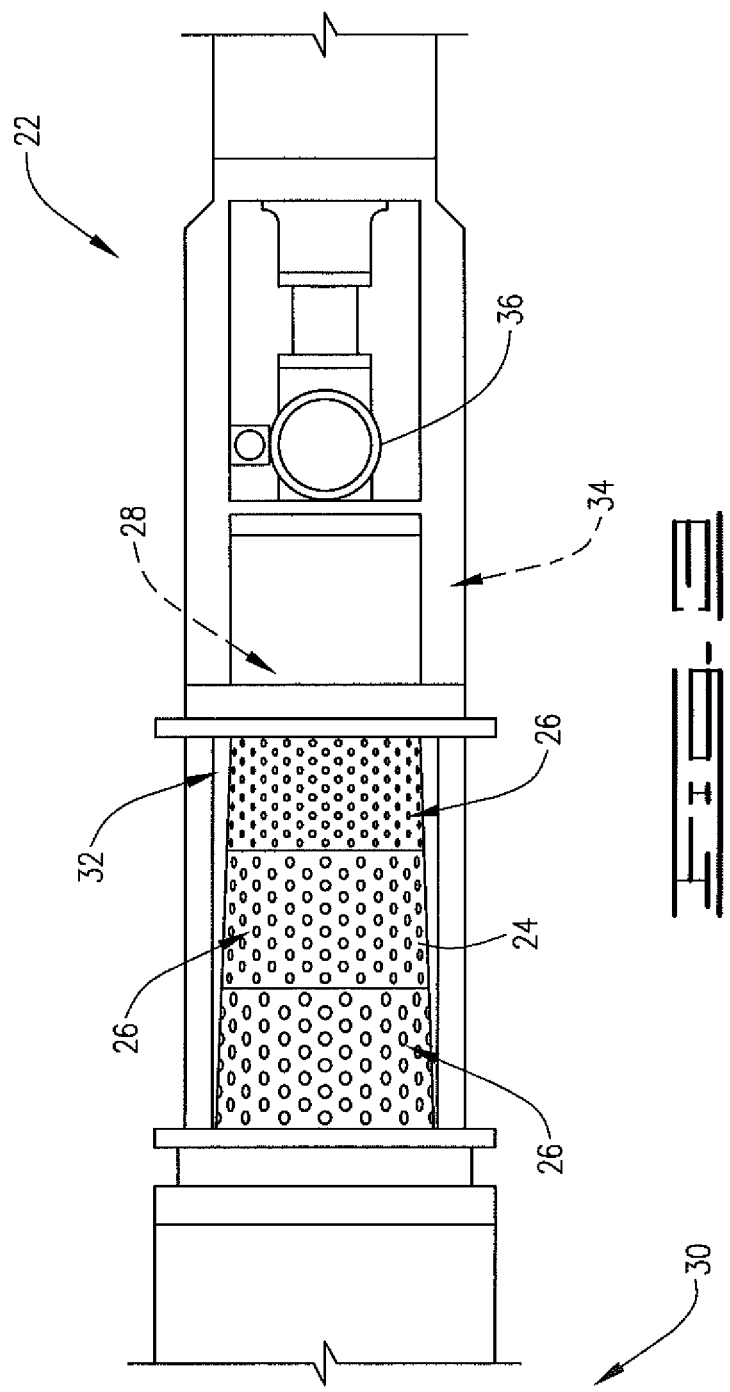

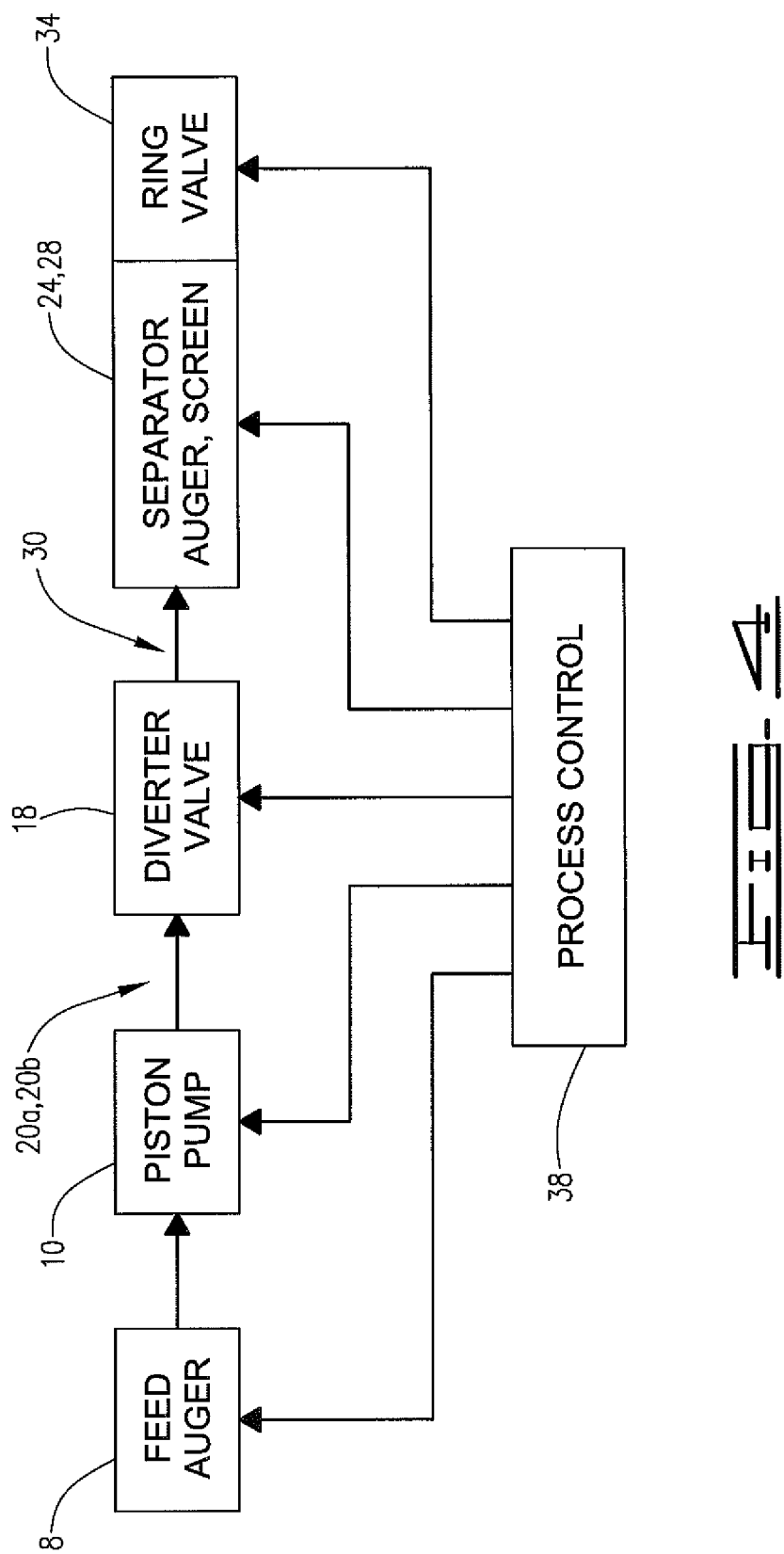

MEAT PROCESSING APPARATUS AND METHOD

BACKGROUND OF THE INVENTION

The present invention relates to apparatus and methods for mechanically processing meat, including beef, pork, and poultry, to obtain a high quality ground or boneless meat product. "Meat," as used in this document refers to beef, pork and poultry (chicken and turkey) products.

Processing of animal proteins such as chicken includes such processes or steps as removing feathers, removing organs, cleaning carcasses, and otherwise preparing the product for marketing for human consumption. For example, ultimately a whole chicken carcass or individual pieces (breast, leg, wing, etc.), still containing their bones, are marketed to humans for baking, frying or other type of cooking. As another example, the whole or parts of the chicken can be deboned (such as for a chicken breast filet) and then sold. Furthermore, the chicken (in our illustration) can be mechanically processed to remove bone and skin and be ground for use in some other manner (for example, chicken nuggets, composition for animal food, material used in medicines). Other meats may be processed in similar ways.

Where the mechanically processed meat is for human consumption, there is the need for an apparatus and method by which a first line, high quality ground or boneless meat can be produced. Desirable qualities of such a product include palatability, long shelf life, acceptable appearance (color, texture), and good protein quality.

SUMMARY OF THE INVENTION

The present invention provides a first line, high quality ground or boneless meat product suitable for human consumption. For example, in a specific use with chicken, the present invention delivers high quality boneless ground chicken or mechanically separated chicken that provides formula flexibility (for example, dark, light, combination of the two) and value potential.

Specific features of a particular apparatus of the present invention include a piston pump and a tapered chamber; and a particular implementation of the method of the present invention cooperatively operates these components to provide low pressure, slow speed, good temperature, high throughput, and low bone breakage (prior to separation) meat processing, whereby label-friendly meat is produced.

Other statements of the present invention include but are not limited to the following:

A feeder-separator combination for a meat deboning apparatus, which combination comprises: a separator assembly including: a sleeve having openings through the side thereof, which openings provide exit for deboned meat, the sleeve also having an inlet and an outlet; and a separator auger disposed in the sleeve for rotation therein adjacent the openings. This combination also comprises a piston pump connected to the inlet of the sleeve such that operation of the piston pump pushes bone-in-meat articles, provided to the piston pump, to the inlet of the sleeve and the separator auger therein for obtaining a ground meat product. Another feature is a ring valve adjustably connected to the outlet of the sleeve; and still another is a diverter valve disposed in the connection between the piston pump and the inlet of the sleeve. A feed auger can be connected to an inlet of the piston pump for providing the bone-in-meat articles to the piston pump.

A method of deboning meat in accordance with the present invention comprises: pumping bone-in-meat articles through a diverter valve into a separator screen and auger assembly having a ring valve therein, wherein the separator screen includes openings through the side thereof; and controlling the diverter valve and the ring valve for achieving a selected combination of processing speed, temperature and pressure such that product classifiable as meat is produced through the openings of the screen. Preferably, the achieved processing speed is within the range of 75 revolutions per minute to 350 revolutions per minute, the achieved processing temperature is within the range of 28° F. to 45° F., and the achieved processing pressure is within the range of 50 pounds per square inch to 300 pounds per square inch. Furthermore, pumping bone-in-meat articles preferably includes using a piston pump connected to the diverter valve.

In a specific use, the present invention provides a method of deboning chicken, comprising: pumping chicken through a diverter valve into a separator including a screen, auger and ring valve assembly, wherein pumping includes using a piston pump and loading the chicken into discharge ends of piston chambers of the piston pump, and further wherein the chicken is selected from piece to whole chicken articles having whole bones therein and skin thereon; and operating the piston pump, diverter valve, auger and ring valve such that whole bones and skin are removed from the piece to whole chicken articles and chicken meat is extruded through openings in the side of the screen.

The objects, features and advantages of the present invention will be readily apparent to those skilled in the art upon a reading of the foregoing and the following detailed description.

BRIEF DESCRIPTION OF THE DRAWINGS

FIG. 3 is an exterior view of a separator auger, tapered screen, and ring valve assembly of a separator apparatus of the embodiment of FIG. 1.

FIG. 4 is a block diagram of a preferred embodiment of the feeder-separator combination of the present invention.

DETAILED DESCRIPTION OF THE INVENTION

Figure 1:
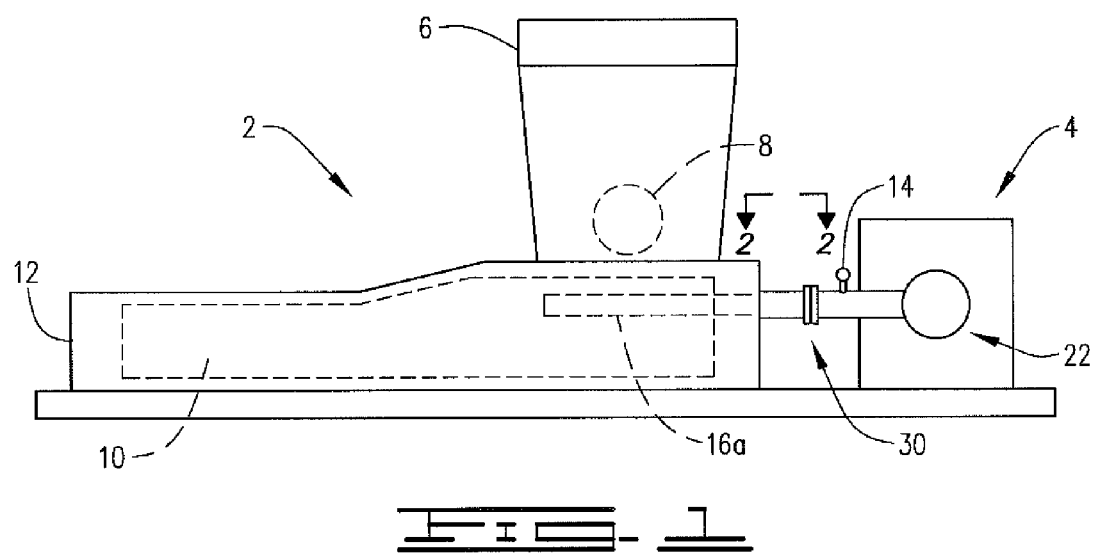
FIG. 1 is a block and schematic view of one embodiment of a food processing system incorporating the present invention.

FIG. 1 shows a system in which and with which the present invention can be implemented. This system includes feed apparatus 2 and separator apparatus 4 connected to feed apparatus 2. Except as otherwise explained herein, both feed apparatus 2 and separator apparatus 4 can be of conventional design, such as respectively provided commercially from Marlen Research Corporation and under brand name BEEHIVE from Provisur Technologies. The present invention focuses on (1) part of the connection between the two apparatus 2, 4 in combination with aspects of separator apparatus 4 and (2) the method of using them to produce a desired product.

Conventional aspects of feed apparatus 2 include a hopper 6 in which input articles to be processed (such as intact bone-in-meat articles in a particular implementation) are placed. From the hopper 6, the articles are moved in conventional manner by a conventional feed auger 8. Suitable conventional drive means, such as a motor (not shown) in feed apparatus 2, rotates the feed auger 8 inside the hopper 6 to move the bone-in-meat articles into a piston pump 10. The piston pump 10 is in a housing 12 and is connected in a conventional manner to receive material from the hopper 6 and to push that material to the separator apparatus 4. A conventional pressure gauge 14 connects in suitable manner to monitor pressure in a selected portion of this equipment (shown in FIG. 1 in the pump output connection to separator apparatus 4). Pump speed can be set and monitored (using known control equipment and steps) using the pressure gauge 14.

Figure 2:
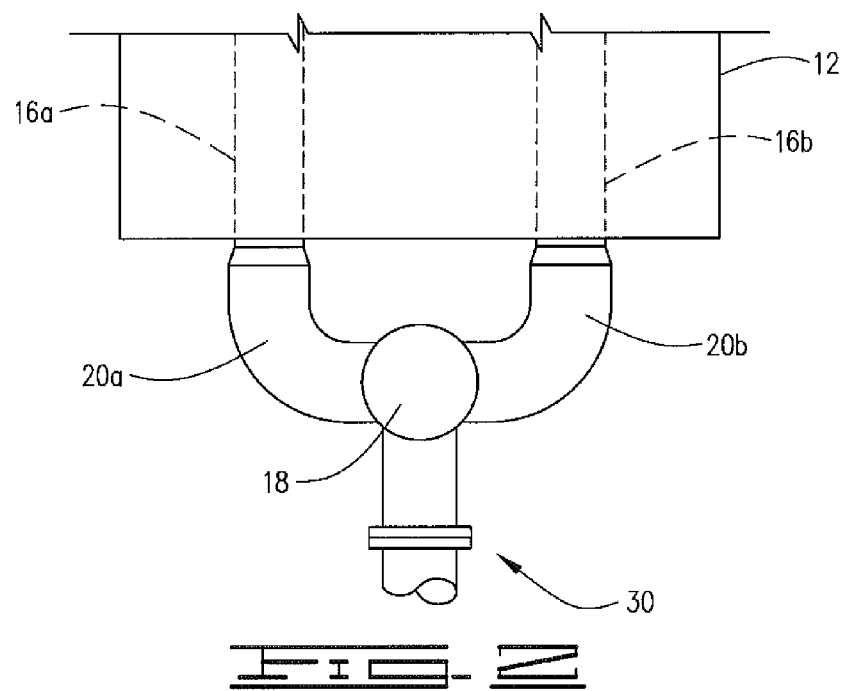
FIG. 2 is a representation of a diverter valve of the embodiment of FIG. 1 as taken along line 2-2 in FIG. 1.

In a specific implementation the piston pump 10 is a hydraulically powered Marlen OPTI 220 piston pump having two parallel piston chambers in which respective pistons are disposed for reciprocal action (that is, the pistons are synchronized so that one is on a forward stroke when the other is on a rearward stroke). The piston chambers communicate through respective compartments (collectively identified by 16a, 16b) with a diverter valve 18 of the Marlen-implemented apparatus 2. Referring to FIG. 2, the diverter valve 18 alternately switches communication between two pump outlet channels 20a, 20b of the apparatus 2 and an inlet to the apparatus 4. Each of the structures (such as pipes or tubes) defining the outlet channels 20a, 20b connects to a respective one of the piston chamber/compartment structures 16a, 16b of the piston pump 10 and to respective inlets of the diverter valve 18.

U.S. Pat. No. 4,097,962 to Alley et al., U.S. Pat. No. 4,700,899 to Powers et al., U.S. Pat. No. 4,747,342 to Schack et al., U.S. Pat. No. 4,780,931 to Powers et al., U.S. Pat. No. 5,479,847 to Powers et al., and U.S. Pat. No. 5,553,985 to Schack et al. are incorporated herein by reference.

Referring to FIG. 3, separator apparatus 4 includes a separator assembly 22 with a sleeve 24 having openings 26 through its side (the term "screen" is also used, such as used in FIG. 4). The openings 26 provide exit for finished meat product of the present invention (such as deboned meat). Deboned meat is pushed through the openings 26 in response to a rotating separator auger 28 that extends within the sleeve 24 and adjacent the openings 26 (the separator auger 28 is rotated in known manner by a motor and its control elsewhere in separator apparatus 4). Deboning occurs when the piston pump 10, which is connected to the inlet of the sleeve 24 via the channels 20a, 20b and diverter valve 18 and coupling 30 (FIGS. 1 and 2; not shown in FIG. 3 other than to indicate general locus of), is operated to push bone-in-meat articles, provided to the piston pump 10 from the hopper 6, to the inlet of the sleeve 24 and the separator auger 28 that is inside the sleeve 22.

The sleeve 24 preferably defines a tapered chamber, which taper is apparent in FIG. 3 as shown at 32. This taper (and the internal tapered chamber defined therein) extends along at least a portion of the length of the sleeve 24. The tapered sleeve 24 (or screen) also is shown in FIG. 3 in a preferred embodiment having a plurality (three in FIG. 3) of groups of respectively-sized openings 26 disposed along the tapered chamber length of the sleeve 24. The screen implemented with the sleeve 24 acts as a grinder plate to determine grind size based on the size of the openings 26 through the side of the sleeve 24. The openings 26 are typically measured in thousandths of an inch and are preferably in the range from 0.030 inch to 0.125 inch in diameter. The screen 24 can be, for example, a straight screen (openings of a single size), step screen (openings of different sizes on the same screen), three-quarter screen (lower portion of screen does not have openings), or arcuate screen (openings are counter flow to the rotation of the separator auger). A particular screen is selected based on the specific application (for example, the lower the meat content on the starting material, the smaller the screen opening size). As mentioned above, however, the preferred embodiment is a tapered screen with three sets or arrays of openings 26, wherein each array has a different diameter opening from the other two arrays (but all in the aforementioned preferred diametric range).

Also marked in FIG. 3 is a ring valve 34 of known type operated in known manner by a ratchet mechanism that includes an operating handle 36.

U.S. Pat. No. Re. 32,060 to McFarland and U.S. Pat. No. 4,566,640 to McFarland et al. are incorporated herein by reference.

Referring to FIG. 4, the preferred embodiment of the present invention's feeder-separator combination for a meat deboning apparatus comprises, in its simplest form, the piston pump 10, screen 24 and separator auger 28 suitably connected. Part of a preferred embodiment of this connection includes the diverter valve 18 that operates to direct the material from whichever piston of the piston pump 10 is on its discharge stroke. The orifice of the diverter valve 18 is small enough to produce a desired yield and yet large enough to allow whole bones to pass through when open. Ring valve 34 also is preferably included and is operated to adjust pressure in the feeder-separator combination. The ring valve 34 is adjusted by operating the ratchet mechanism; this adjustment affects the pressure in the sleeve. Tightening the ring valve 34 can increase pressure and yield; however, care should be taken not to tighten too much because then bone in the flow stream could start breaking and pressure could build up throughout the system (too much pressure also can force bone marrow and blood into the finished product exiting openings 18, which is not desired). Each of these components (as well as feed auger 8) is controlled by process control 38. Some of process control 38 can be by manual operation (for example, screen size selection and installation, ring valve adjustment, auger speeds, pump operation) or by automatic operation (for example, operation of diverter valve 18 synchronized with piston movement in piston pump 10). Specific control operations for each of these components are known in the art, but they are now in the present invention used in inventive combination to obtain the operating conditions of the present invention described herein.

The foregoing is used in accordance with the method of the present invention to produce desired product. Preferably it is used to produce a first line product suitable for being labeled "meat" as that term is known in the art (having suitably low levels of bone and skin in the product, such as can be determined using tests known in the art) and having desired composition, appearance, palatability, shelf life, and protein quality. The beginning material, the intact "bone-in-meat articles," can be any type of meat product that can be processed with the invention. One specific type of meat is from chickens, and the starting bone-in-meat articles can be any intact part or whole of a chicken in this case. "Intact" refers to the feedstock chicken having whole bones and skin, which are to be removed by the method of the present invention. Cleaned (de-feathered) chicken halves, whole legs, leg quarters, necks, wings and the whole body are a few examples. Although the present invention is for deboning meat products and producing a high quality output product, the invention can also be used to provide high quality output that starts from previously-deboned input material (i.e., before being processed by the present invention).

Accordingly, the present invention provides a method of deboning meat. Referring to previously described apparatus, this method comprises pumping bone-in-meat articles through the diverter valve 18 into the separator screen and auger assembly 24, 28 having connected ring valve 34. This method also includes controlling the diverter valve 18 and the ring valve 34 for achieving a selected combination of processing speed, temperature and pressure such that product classifiable as meat is produced through the openings of the screen. Pumping bone-in-meat articles preferably includes using the piston pump 10 connected to the diverter valve 18.

Preferably, the processing speed is a slow speed within the range of 75 revolutions per minute (rpm) to 350 rpm (at the separator auger 28), the processing temperature within the material flow stream is within the range of 28° F. to 45° F., and the processing pressure within the material flow stream is a low pressure within the range of 50 pounds per square inch (psi) to 300 psi (as controlled at least in part by the ring valve 34). Controlling the processing speed is important, at least in part, because it determines the length of muscle fibrils. Controlling the processing temperature is important, at least in part, because it determines how soft tissue separates from the bone and aligns through the exit openings. Controlling the processing pressure is important, at least in part, because it determines how much bone marrow and blood is pressed into the muscle tissue. Processing speed, temperature, and pressure in combination determine quality attributes including water binding functionality, texture, color, flavor, and shelf life. Also contributing to the quality of the end product is the opening 26 size(s), preferably in the range of 0.030 inch to 0.125 inch. These are achieved by using the preferred piston pump/tapered chamber combination that enables the combination of control functions to be provided; this combination enables the input material to be moved in mass with reduced bone breakage and with the attainment of low speed, low pressure, low temperature variation to provide high yield of high quality output product not obtained with prior pump/separator apparatus.

All of these controls (and structural aspects of piston pump and tapered screen) contribute to the overall quality and yield of end-product meat (that is, the product coming out of the openings 26 in the sleeve 24) compared with the beginning bone-in-meat articles. Yield is calculated by measuring the weight of the output meat and dividing it by the weight of bone-in-meat articles (meat+bone+skin); this value is multiplied by 100 to state the yield as a percentage. So, in the particular use with bone-in-meat input material (such as intact chicken wholes or parts) a desirable yield is obtained by operating the piston pump 10, diverter valve 18, auger 28 and ring valve 34 such that whole bones and skin are removed from the input material and meat is extruded through the openings 26 in the side of the screen 24.

Once the method has been used, there are two end products: (1) the high quality (minimal bone content and good muscle integrity, color, shelf life, and protein content, for example) meat that is produced through the openings 26 of the screen 24 and (2) the residue of bone, skin and connective tissue that exits through the outlet of the screen 24 and the ring valve 34 connected thereto. These products can then be used in known manner (for example, the former in human food products and the latter in pet or pharmaceutical applications).

Thus, the present invention is well adapted to carry out the objects and attain the ends and advantages mentioned and alluded to as well as those which are inherent therein.

What is claimed is:

1. A feeder-separator combination for a meat deboning apparatus, comprising:
   a separator assembly including:
      a sleeve having openings through the side thereof, which openings provide exit for deboned meat, the sleeve also having an inlet and an outlet; and
      a separator auger disposed in the sleeve for rotation therein adjacent the openings; and
   a piston pump connected to the inlet of the sleeve such that operation of the piston pump pushes bone-in-meat articles, provided to the piston pump, to the inlet of the sleeve and the separator auger therein for obtaining a ground meat product.

2. A feeder-separator combination as defined in claim 1, wherein:
   the separator assembly further includes a ring valve adjustably connected to the outlet of the sleeve; and
   the feeder-separator combination further comprises a diverter valve disposed in the connection between the piston pump and the inlet of the sleeve.

3. A feeder-separator combination as defined in claim 2, further comprising a feed auger connected to an inlet of the piston pump for providing the bone-in-meat articles to the piston pump.

4. A feeder-separator combination for a meat processing apparatus, comprising:
   a separator assembly including a sleeve with openings through the side thereof, which openings provide exit for meat, wherein the sleeve defines a tapered chamber along at least a portion of the length of the sleeve; and
   a piston pump connected to the sleeve such that operation of the piston pump pushes meat articles, provided to the piston pump, into the tapered chamber of the sleeve.

5. A feeder-separator combination as defined in claim 4, wherein the openings include three groups of respectively-sized openings disposed along the tapered chamber length of the sleeve.

6. A feeder-separator combination as defined in claim 5, wherein:
   the separator assembly further includes a ring valve adjustably connected to the sleeve; and
   the feeder-separator combination further comprises a diverter valve disposed in the connection between the piston pump and the sleeve.

7. A feeder-separator combination as defined in claim 6, wherein:
   the feeder-separator combination further comprises a feed auger connected to the piston pump for providing the meat articles to the piston pump; and
   the separator assembly further includes a separator auger disposed in the sleeve for rotation therein adjacent the openings.

8. A method of deboning meat, comprising:
   pumping bone-in-meat articles through a diverter valve into a separator screen and auger assembly having a ring valve therein, wherein the separator screen includes openings through the side thereof; and
   controlling the diverter valve and the ring valve for achieving a selected combination of processing speed, temperature and pressure such that product is produced through the openings of the screen.

9. A method as defined in claim 8, wherein the achieved processing speed is within the range of 75 revolutions per minute to 350 revolutions per minute, the achieved processing temperature is within the range of 28° F. to 45° F., and the achieved processing pressure is within the range of 50 pounds per square inch to 300 pounds per square inch.

10. A method as defined in claim 9, wherein pumping bone-in-meat articles includes using a piston pump connected to the diverter valve.

11. A method of deboning meat, comprising:
    pumping chicken through a diverter valve into a separator including a screen, auger and ring valve assembly, wherein pumping includes using a piston pump and loading the chicken into discharge ends of piston chambers of the piston pump, and further wherein the chicken is selected from piece to whole chicken articles having whole bones therein and skin thereon; and operating the piston pump, diverter valve, auger and ring valve such that whole bones and skin are removed from the piece to whole chicken articles and chicken meat is extruded through openings in the side of the screen.

12. A method as defined in claim 11, wherein operating the piston pump, diverter valve, auger and ring valve includes achieving in combination an auger speed within the range of 75 revolutions per minute to 350 revolutions per minute, a processing temperature within the range of 28° F. to 45° F., and a processing pressure within the range of 50 pounds per square inch to 300 pounds per square inch.

13. A method of processing meat, comprising:

pumping, using a piston pump, meat articles through a diverter valve into a tapered separator screen and auger assembly having a ring valve therein, wherein the tapered separator screen includes arrays of different sized openings through the tapered side thereof; and controlling at least the diverter valve and the ring valve for achieving a selected combination of slow processing speed, temperature, and low pressure such that product classifiable as meat is produced through the openings of the tapered separator screen.

14. A method as defined in claim 13, wherein:

the achieved slow processing speed for the auger is within the range of 75 revolutions per minute to 350 revolutions per minute, the achieved processing temperature is within the range of 28° F. to 45° F., and the achieved low pressure is within the range of 50 pounds per square inch to 300 pounds per square inch; and the different sized openings through the tapered side of the tapered separator screen are within the range of 0.030 inch to 0.125 inch.

\* \* \* \* \*